Figure 1:
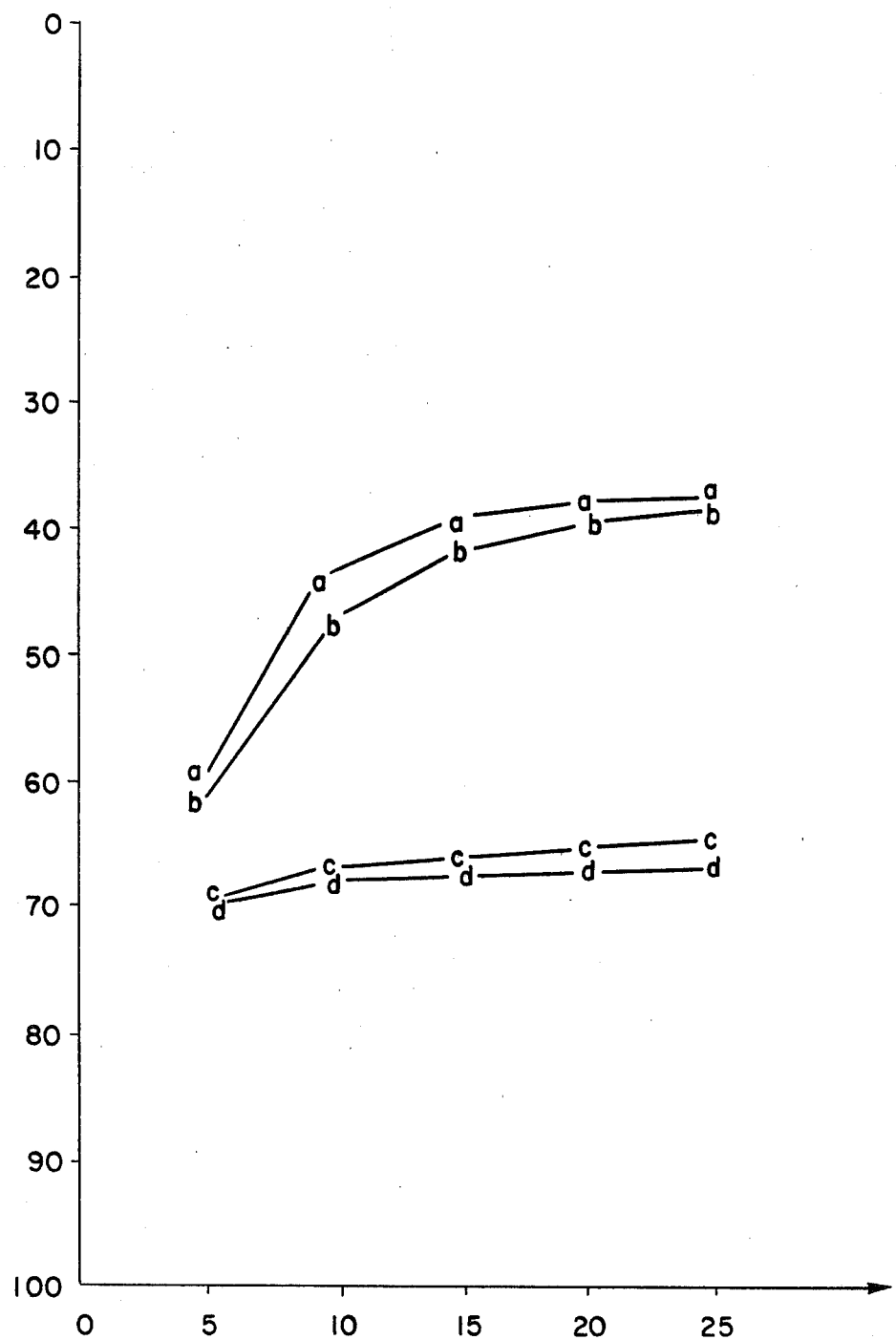

United States Patent [19]

Olivieri et al.

[11] 4,414,333
[45] Nov. 8, 1983

[54] COMPOSITIONS FOR DEPOLLUTING FRESH WATER AND SALT WATER BODIES

[75] Inventors: Roberto Olivieri, Mentana; Andrea Robertiello; Ludwig Degen, both of Rome, all of Italy

[73] Assignee: Snamprogetti, S.p.A., Milan, Italy

[21] Appl. No.: 315,473

[22] Filed: Oct. 27, 1981

Related U.S. Application Data

[60] Division of Ser. No. 133,246, Mar. 24, 1981, abandoned, which is a continuation of Ser. No. 823,043, Aug. 8, 1977, Pat. No. 4,230,562.

[30] Foreign Application Priority Data

Sep. 1, 1976 [IT] Italy .............................. 26751 A/76
Jun. 8, 1977 [IT] Italy .............................. 24495 A/77

[51] Int. Cl.³ .............................................. C02F 3/02
[52] U.S. Cl. ................................... 435/243; 210/610; 210/922; 435/244; 435/281; 252/357
[58] Field of Search .............. 210/610, 611, 922, 925; 252/312, 352, 354, 356, 357; 71/28–30; 435/243, 244, 281

[56] References Cited

U.S. PATENT DOCUMENTS

| | | | |
|---|---|---|---|
| 3,293,145 | 12/1966 | Leavitt et al. | 435/244 |
| 3,365,468 | 1/1968 | Feichtinger | 549/426 |
| 3,476,647 | 11/1969 | Ushioda et al. | 435/244 |
| 3,546,071 | 12/1970 | Douros et al. | 435/68 |
| 3,634,284 | 1/1972 | Benson et al. | 252/357 |
| 3,798,127 | 3/1974 | Dogariu et al. | 435/244 |
| 3,900,421 | 8/1975 | Fusey | 210/925 |
| 3,959,127 | 5/1976 | Bartha et al. | 210/610 |
| 3,970,625 | 7/1976 | Moore et al. | 71/30 |
| 3,977,942 | 8/1976 | Inamine et al. | 435/244 |
| 4,042,495 | 8/1977 | Marconi et al. | 210/610 |
| 4,087,356 | 5/1978 | Marconi et al. | 210/610 |
| 4,230,562 | 10/1980 | Olivieri et al. | 210/610 |

*Primary Examiner*—Peter A. Hruskoci
*Attorney, Agent, or Firm*—Morgan, Finnegan, Pine, Foley & Lee

[57] ABSTRACT

Compositions are disclosed, which are adapted to depollute fresh and sea water bodies from crude oil and petroleum product pollution by microbial action. The growth of micro-organisms capable of metabolizing hydrocarbons is exalted by certain combination of nutrients, such as lecithin as a phosphorus source, hydantoins, amides allophanates, polyamines, acyl-ureas and esters of the hydantoic and allantoic acids as the nitrogen sources. Ureido-derivatives of amides are also contemplated as additional nutrients.

3 Claims, 3 Drawing Figures

COMPOSITIONS FOR DEPOLLUTING FRESH WATER AND SALT WATER BODIES

This is a division of application Ser. No. 133,246 filed Mar. 24, 1980 now abandoned which is a continuation of application Ser. No. 823,043 filed Aug. 8, 1977 now U.S. Pat. No. 4,230,562.

This invention relates to compositions for microbiologically removing polluting agent from coasts, fresh water and sea water bodies as caused by crude oils, petroleum products and their derivatives.

The invention is likewise concerned with the preparation of media adapted to encourage the scattering of such pollutants while concurrently furnishing the nutrients which are essential for the growth of naturally occurring and/or added micro-organisms capable of oxidizing hydrocarbons and petroleum crude oils.

In the Italian Pat. No. 981 945 in the name of the same Applicants hereof there has been disclosed and claimed the preparation and the use of compositions based on salts which are poorly water-soluble and have been made lipophilic and floatable by means of a paraffination procedure, and which contain nitrogen and phosphorus in an assimilable form by aquatic micro-organisms capable of metabolizing hydrocarbonaceous materials.

In the U.S. Patent application No. 738.697 there has been disclosed and claimed the integration of such compositions of poorly water-soluble salts, more particularly paraffinated magnesium and ammonium phosphates, with lipophilic floating compunds, which can float as themselves or are made floatable by paraffination and which contain slow-release nitrogen which can be assimilated by the micro-organisms concerned so as to obtain P+N/oil ratios which are the most favourable for biological degradation.

Compounds which are adapted to this purpose were those belonging to the chemical class of the ureido-derivatives of aldehydes.

It had further been shown that biodegradation, while still encouraged by these compounds, was further exalted by using nonionic dispersants.

These latter compounds unfold a synergistic action relative to that of the nutrients, thus causing a better distribution to occur of the nutrients themselves in the oily phase, said nutrients being contained in the formulations referred to above.

It has now been ascertained, and this is a first subject-matter of the present invention, that lecithin, a phosphatide ester occurring in many a natural produce of animal or vegetable nature, can efficiently replace both the phosphorus source and the dispersant of the formulation referred to above .

As a matter of fact, lecithin is used up by the hydrocarbon-oxidizing micro-organisms which are naturally occurring in sea water, as a phosphorus source.

In addition, inasmuch as lecithin is endowed of prominent emulsifying properties which are due to the presence of hydrophilic and lipophilic functional groups, it replaces, either wholly or in part, the capillary-active agents in the formulations referred to hereinabove.

It has been found, moreover, and this is a further subject-matter of the present invention, that the compounds belonging to the chemical classes of hydantoins and amides, in addition to the aldehyde-urea condensation products mentioned above, can advantageously be used as nitrogen sources which can be assimilated by the hydrocarbon-oxidizing micro-organisms.

As a matter of fact, while the fertilizing action of the ureido-derivatives of aldehydes is subordinate to a chemical hydrolysis, the fertilizing action of hydantoins and amides unfolds itself by enzymic hydrolysis as brought about by the hydrocarbon-oxidizing micro-organisms themselves.

Now, while the chemical hydrolysis of the urcido derivatives is governed by the physico-chemical factors of water, especially the temperature and the pH value, environmental situations may arise, in which urea is set free either in excess or defect of the nutritional requirements of the hydrocarbon-oxidizing micro-organisms: in the former case a slowdown of the biological degradation is brought about and, in the latter case, urea is inadequately utilized and this is an economical damage.

No such drawback is experienced when using chemical compounds of the class of hydantoins and amides since the nitrogen contained therein is set free, and used up directly by the micro-organisms consistently with their actual demand.

It has been found, moreover, that a considerable increase of the biological degradation velocity of the hydrocarbons is obtained when such nitrogen source, that is hydantoins and amides, are employed concurrently with lecithin.

The formulations suggested by this invention can easily be applied in the practice, as they do not require any special implementation but that adopted hitherto by the first-aid means which use dispersants in hydrocarbon pollution cases.

The substances which can be used according to the method of this invention can be stored indefinitely, do not belong to the class of the toxic products, can easily be carried to the place of use and can readily be spread on the polluted areas: they permit within a short delay that pollution of fresh and sea water bodies by oil, petroleum products and their derivatives be done away with.

An important advantage of this method lies in the facrt that the employed substances speed up a natural process of biological degradation of the pollutants without disturbing the oecological equilibrium.

That which has been outlined above and further working conditions will be more clearly understood from the scrutiny of the ensuing examples reported hereinafter to the only purpose of better illustrating the invention without limiting the scope thereof.

In addition to what has been indicated above, the present Applicants have also found, and this is another subject-matter of the present invention, that also the phosphatides, both synthetic and naturally occurring in many produces of both animal and vegetable origin, can constitute both the phosphorus source and the dispersant.

It has also been found, and this is yet another subject-matter of the present invention, that there can be used with advantage as nitrogen sources assimilable by the hydrocarbon-oxidizing micro-organisms, in addition to the compounds belonging to the chemical classes of hydantoins and amides, also compounds belonging to the chemical classes of the allophanates, the polyamines, the acyl-ureas and the esters of the hydantoic and allantoic acids.

As a matter of fact, also the fertilizing action of the nitrogenous compounds listed above unfolds itself by enzymic hydrolysis as caused by the hydrocarbon-oxidizing micro-organisms themselves.

It has been found, additionally, that an outstanding increase of the biological degradation velocity of hydrocarbons is achieved whenever such nitrogen sources, that is, in addition to hydantoins and amides, the allophanates, the polyamines, the acyl-ureas and the esters of the hydantoic and allantoic acids, are employed together with the phosphatides, both synthetic and naturally occurring.

The formulations suggested by the present invention are easy to be applied, do not require any special implementation, but those used hitherto by the first-aid means which use dispersants in cases of hydrocarbon pollution cases.

The substances which can be employed according to the method of the present invention can be stored indefinitely, do not belong to the class of toxic products, can easily be shipped to the place of use and can readily be spread over the polluted areas and permit that the pollutions of fresh and sea water bodies by crude oil, petroleum products and their derivatives be readily put out.

An outstanding advantage of such method lies in the face that the employed substances quicken a natural process of biological degradation of the pollutants without interfering with the oecological equilibria.

That which has been set forth hereinabove and further features of application will be better understood from the scrutiny of the following examples, which are reported herein to the only purpose of illustrating the invention without limiting the scope thereof.

EXAMPLE 1

250-ml Erlenmayer flasks with ground-glass necks which contain 100 mls of unsterilized sea water and 100 milligrams of Basra crude each, are charged with;

(a) 5 milligrams of soybean lecithin and 5 milligrams urea (b) 0.84 milligram of $K_2HPO_4$ and 5 milligrams urea (c) 5 milligrams urea (d) control with no additions.

The flasks were incubated at 25° C. with rotatory stirring (100 rpm, eccentricity 5 centimeters). At the 0 time and every 5 days the residue of crude was determined by extraction with $CCl_4$ according to the method described in the above mentioned patent application.

The results which have been obtained are illustrated in FIG. 1, in which the ordinates show the residual crude expressed in percent, and the abscissae are the time in days.

EXAMPLE 2

250-ml Erlenmayor flasks having ground-glass necks and containing, each, 100 mls of unsterilized sea water and 100 milligrams of Basra crude were charged with:

(a) 5 milligrams of soybean lecithin and 6.5 milligrams oxamide (b) 5 milligrams soybean lecithin and 13 milligrams of D-L-5-phenylhydantoin (c) 5 milligrams of soybean lecithin and 10 milligrams of the condensation product of isovaleric aldehyde and urea obtained as described in EXAMPLE 3.

(d) 5 milligrams of soybean lecithin and 15 milligrams of the condensation product of 3-phenylpropionic aldehyde and urea, as obtained under the same conditions adopted for isovaleric aldehyde, for which see EXAMPLE 3 hereinafter.

(e) control with no additions.

The flasks were incubated and the residual hydrocarbons were extracted as described hereinabove.

The results which have been obtained are illustrated in TABLE 1.

TABLE 1

| Incubation time, days Nutrient formulations | 7 | 12 | 19 | 25 |
|---|---|---|---|---|
| (a) | 63.99(*) | 60.47 | 42.26 | 36.62 |
| (b) | 67.23 | 61.65 | 47.81 | 38.28 |
| (c) | 63.74 | 54.43 | 44.91 | 40.06 |
| (d) | 59.78 | 54.85 | 47.79 | 43.17 |
| (e) | 69.12 | 67.55 | 66.79 | 65.92 |

(*) % residual oil.

EXAMPLE 3

250-ml Erlenmayer flasks with ground-glass necks and containing, each, 100 mls of unsterilized sea water and 100 milligrams of Basra crude were charged with:

(a) 5 milligrams of soybean lecithin, 5 milligrams of an emulsifier (2,2'-hydroxydiethylolcylamide) and 10 milligrams of the condensation product of isovaleric aldehyde and urea, obtained in the following way: 20 mls of an aqueous 25% solution of urea were supplemented by 1 ml glacial acetic acid and 2 mls of aldehyde, the mixture was allowed to stay stirred at room temperature for three hours. The precipitate thus obtained was collected on a paper filter, washed with water and dried in a vacuum oven at 40° C. for 24 hours.

(b) same composition as (a) but without the emulsifier.

(c) control, with no additions.

Figure 2:
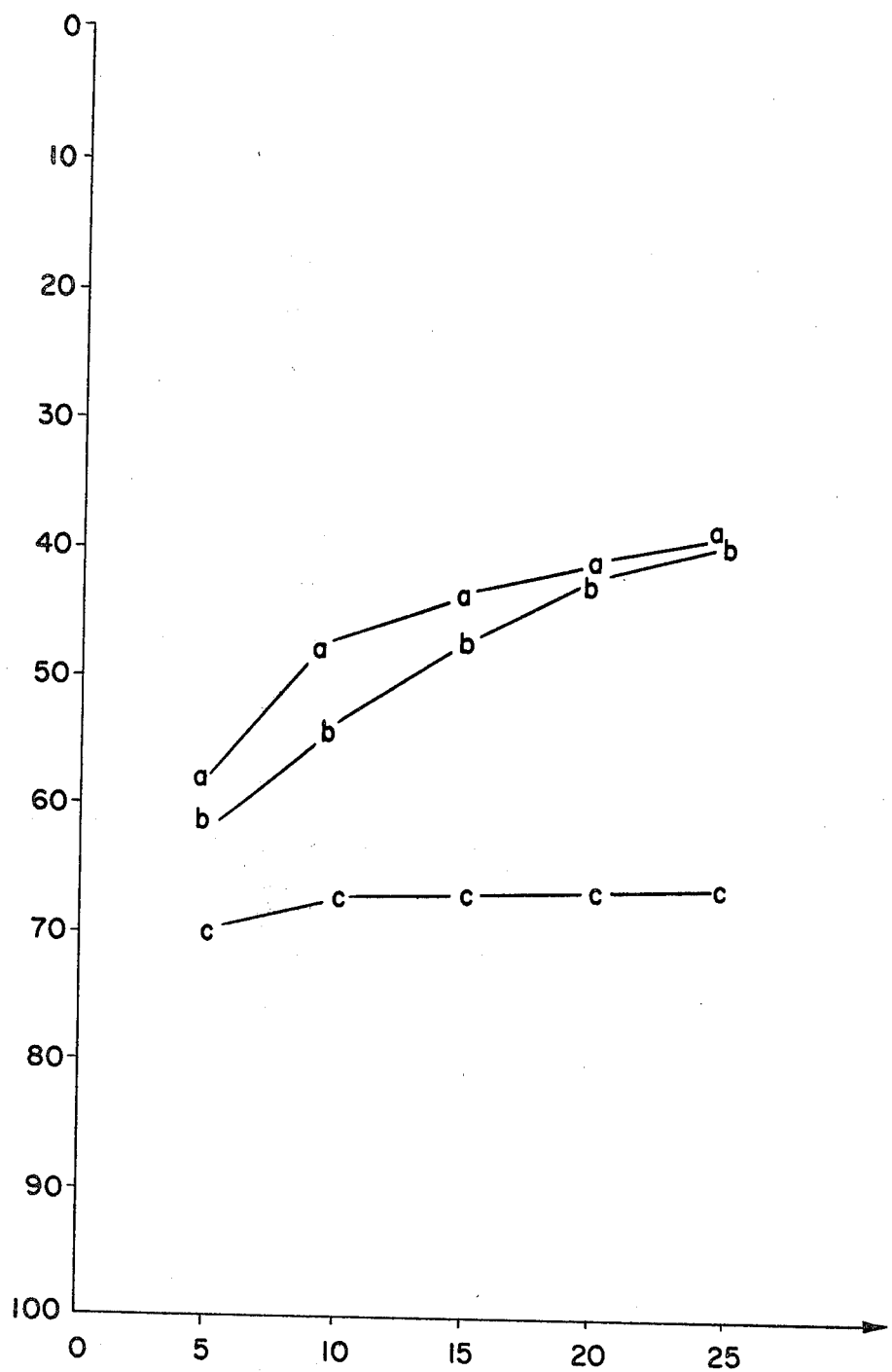

The results which have been obtained are illustrated in FIG. 2, in which the ordinates report the residual crude percentage and the abscissae indicate the time in days.

EXAMPLE 4

250-ml Erlenmeyer flasks having ground-glass necks and containing, each, 100 mls of unsterilized sea water amd 100 mls of Basra crude were charged with:

(a) 5 milligrams of soybean lecithin and 5 milligrams of urea (b) 5 milligrams of dihexadecanoyl-phosphatidyl ethanolamina and 5 milligrams of urea.

(c) 0.84 milligrams of $K_2HPO_4$ and 5 milligrams of urea (d) 5 milligrams urea (e) control with no additions.

The flasks were incubated at 25° C. with rotary stirring (100 rpm, eccentricity 5 centimeters).

At the zero time and every 5 days the residue of crude was determined by extraction with $CCl_4$ according to the method disclosed in the above mentioned patent application.

Figure 3:
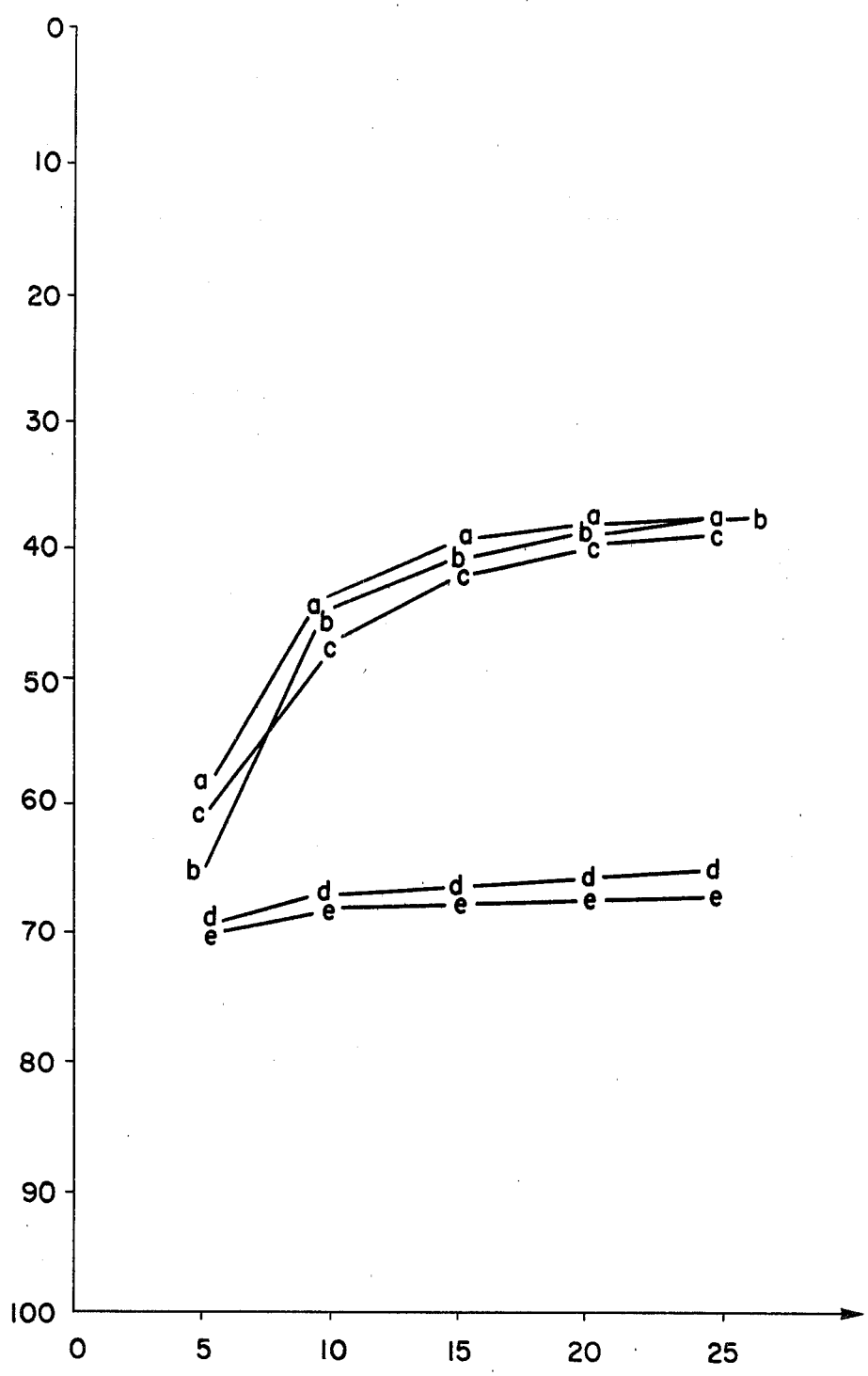

The results which have been obtained are shown in FIG. 3 in which the ordinates show the residual crude percentage and the abscissae are the time in days.

EXAMPLE 5

250-ml Erlenmeyer flasks having ground-glass necks and containing, each, 100 mls of unsterilized sea water and 100 milligrams of Basra crude were charged with:

(a) See EXAMPLE 2

(b) See EXAMPLE 2

(c) See EXAMPLE 2.

(d) See EXAMPLE 2

(e) 5 milligrams of soybean lecithin and 10 milligrams of ethyl allophanate, (f) 5 milligrams of soybean lecithin and 8 milligrams of spermidin, (g) 5 milligrams of soybean lecithin and 12 milligrams of phenylacetyl urea, (h) 5 milligrams of soybean lecithin and 12 milligrams of butyl hydantoinate, (i) 5 milligrams of soybean lecithin and 8 milligrams of butyl allantoinate.

The flasks were incubated and the residual hydrocarbons extracted as described hereinabove.

The results which have been obtained are illustrated in TABLE 2.

TABLE 2

| Nutrient formulations | Incubation time, days | | | |
|---|---|---|---|---|
| | 7 | 12 | 19 | 25 |
| (a) | 63.99(*) | 60.47 | 42.26 | 36.62 |
| (b) | 67.23 | 61.65 | 47.81 | 38.28 |
| (c) | 63.74 | 54.43 | 44.91 | 40.06 |
| (d) | 59.78 | 54.85 | 47.79 | 43.17 |
| (e) | 66.12 | 59.77 | 46.00 | 36.12 |
| (f) | 67.24 | 60.44 | 47.32 | 39.39 |
| (g) | 65.66 | 56.11 | 45.28 | 37.21 |
| (h) | 61.88 | 56.19 | 47.29 | 39.18 |
| (i) | 60.03 | 54.28 | 45.14 | 37.13 |

(*) residual oil, %. As can be seen, the results of TABLE 1 of Example 2 have fully been confirmed as to items (a), (b), (c) and (d).

We claim:

1. A composition adapted to depolluting fresh and sea water bodies from crude oil, petroleum products and their derivatives, containing phosphorus and slow-release nitrogen in a form which can be assimilated by aquatic micro-organisms capable of metabolizing hydrocarbons, said composition consisting essentially of soybean lecithin as said phosphorus source, and as said nitrogen source a nitrogen source selected from the group consisting of spermidin, butyl hydantoinate and butyl allantoinate, said lecithin and said nitrogen in said phosphorus and slow-release nitrogen containing composition being present in an amount sufficient to increase the natural biodegradation of said pollutants caused by the metabolization of hydrocarbons by said micro-organisms, the ratio by weight of said nitrogen to said phosphorus in said composition being greater than about 12 to 1.

2. A composition adapted to depolluting fresh and sea water bodies from crude oil, petroleum products and their derivatives, containing phosphorus and slow-release nitrogen in a form which can be assimilated by aquatic micro-organisms capable of metabolizing hydrocarbons, said composition consisting essentially of soybean lecithin as said phosphorus source, and as said nitrogen source mixtures of a nitrogen source including 2,2'-hydroxyethyloleylamide and the condensation product of isovaleric aldehyde and urea, said phosphorus and said nitrogen in said composition being present in an amount sufficient to increase the natural biodegradation of said pollutants caused by the metabolization of hydrocarbons by said aquatic microorganisms, the ratio by weight of said nitrogen to said phosphorus in said composition being greater than about 12 to 1.

3. A composition adapted to depolluting fresh and sea water bodies from crude oil, petroleum products and their derivatives, containing phosphorus and slow-release nitrogen in a form which can be assimilated by aquatic micro-organisms capable of metabolizing hydrocarbons, said composition consisting essentially of soybean lecithin as said phosphorus source and ethyl allophanate as said slow-release nitrogen source, said phosphorus and said nitrogen in said composition being present in an amount sufficient to increase the natural biodegradation of said pollutants caused by the metabolization of hydrocarbons by said aquatic microorganisms, the ratio by weight of said nitrogen to said phosphorus in said composition being greater than about 12 to 1.

* * * * *

UNITED STATES PATENT AND TRADEMARK OFFICE
CERTIFICATE OF CORRECTION

PATENT NO. : 4,414,333
DATED : November 8, 1983
INVENTOR(S) : Roberto Olivieri, Andrea Robertiello, Ludwig Degen It is certified that error appears in the above-identified patent and that said Letters Patent is hereby corrected as shown below:

On the cover page item [73] should read

-- Assignee: Anic, S.p.A., Palermo, Italy --.

Signed and Sealed this

Twelfth Day of February 1985

[SEAL]

Attest:

DONALD J. QUIGG

Attesting Officer     Acting Commissioner of Patents and Trademarks